UNITED STATES PATENT OFFICE.

WALLACE A. BEATTY, OF NEW YORK, N. Y., ASSIGNOR, BY DIRECT AND MESNE ASSIGNMENTS, TO JOHN NORDHOUSE, TRUSTEE, OF NEW YORK, N. Y.

BAKING-POWDER.

No. 931,027.   Specification of Letters Patent.   Patented Aug. 17, 1909.

Application filed June 1, 1908. Serial No. 435,862.

*To all whom it may concern:*

Be it known that I, WALLACE A. BEATTY, a citizen of the United States, residing at New York, in the county and State of New York, have invented certain new and useful Improvements in Baking-Powder, of which the following is a specification.

In "baking powder" as commonly made the substances which are employed for the production of the desired carbon dioxid are sodium bicarbonate and an acid tartrate, usually of potassium, as for example the well known "cream of tartar." In the chemical combination which takes place between the bicarbonate and the cream of tartar carbonic acid gas and sodium potassium tartrate are produced. The latter is the well known "Rochelle salt", and when taken in sufficient amount has a marked physiological effect. Of course the quantity of the salt taken into the system by eating bread made with baking powder is generally very small, but it is now well understood that a substance which ordinarily produces no deleterious results may by frequent ingestion, even in comparatively minute quantities, have a cumulative effect of an injurious character. Moreover, Rochelle salt has no nutritive value, since it is not a food in any sense of the term. I have therefore been led to devise my present invention, which has for its chief object to provide a baking powder in which the non-gaseous product or products of the reaction will have a true food value rather than a medicinal or analogous effect on the digestive functions.

To this end my improved baking powder consists essentially of a carbonate, preferably sodium bicarbonate; a filler or diluent, as starch, flour, or other inert food product of similar nature; and an amino acid or acids, or an acid compound thereof, as for example a hydrochlorid.

In the appended claims I specify merely "amino acid" as the acid constituent of the powder, but the term is there used with a generic significance to include within the scope of the claims more than one amino acid, or an acid compound thereof, as equivalents.

When baking powder composed of such substances is used in the ordinary way, carbonic acid gas is evolved by the reaction of the bicarbonate and the amino acid, the reaction being, in general, as follows:

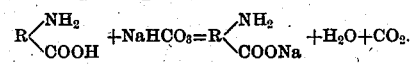

The solid product of the reaction is a proteid-like substance, (similar to the substances resulting from the tryptic digestion of proteids), which of course is a true food and has no action on the digestive organs even when its use is long continued. Where the acid constituent of the powder is a hydrochlorid, as mentioned above, the solid product of the reaction has a small proportion of sodium chlorid, which, as common salt, is a recognized food. In this case the reaction is, in general, as follows:

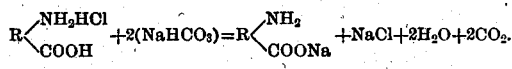

In the above reactions the symbol R stands for an organic radical composed in general of C and H. For example, in glycocoll the symbol denotes $CH_2$.

The quantitative composition of the powder is preferably such that the yield of carbonic acid will be about twelve per cent.; that is, that the powder will lose about twelve per cent. of its weight by the reaction. For this purpose I prefer to have the composition approximately as follows, by weight: amino acid, 37.5 per cent.; flour, starch, or other suitable diluent or filler, 37.5 per cent.; and sodium bicarbonate, 25 per cent. These proportions may, however, be varied without departing from the spirit of the invention. If hydrochlorid of an amino acid or acids is used as the acid constituent, a smaller proportion thereof may be used, in accordance with its greater acid properties; in which case the quantity of the diluent or filler would be increased, the amount of the bicarbonate remaining the same unless the amount of carbonic acid produced is to be varied.

The mixing of the ingredients may be effected in any convenient way; but in order to avoid any premature reaction, one or the other of the reagents should be mixed with the diluent or filler first, and then the other reagent admixed therewith.

What I claim is:

1. A baking powder containing amino acid, sodium bicarbonate, and a suitable diluent or filler.

2. A baking powder containing amino acid, sodium bicarbonate, and flour.

3. A baking powder containing the following ingredients in approximately the proportions named, by weight; an amino acid, 37.5 per cent.; sodium bicarbonate, 25 per cent.; and an inert food product as a filler or diluent, 37.5 per cent.

WALLACE A. BEATTY.

Witnesses:
 WM. W. LESEM,
 ROBT. A. ADAMS.